United States Patent
Vachon

(10) Patent No.: US 6,681,348 B1
(45) Date of Patent: Jan. 20, 2004

(54) CREATION OF MINI DUMP FILES FROM FULL DUMP FILES

(75) Inventor: Andre F. Vachon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 566 days.

(21) Appl. No.: 09/738,529

(22) Filed: Dec. 15, 2000

(51) Int. Cl.$^7$ ............................................. G06F 11/00
(52) U.S. Cl. ............................................. 714/45; 714/38
(58) Field of Search ............................ 714/45, 38, 39, 714/46, 26, 33, 37; 717/1–11

(56) References Cited

U.S. PATENT DOCUMENTS

| | | | |
|---|---|---|---|
| 5,111,384 A | | 5/1992 | Aslanian et al. ............ 395/575 |
| 5,293,612 A | | 3/1994 | Shingai ....................... 395/425 |
| 5,339,406 A | * | 8/1994 | Carney et al. |
| 5,603,033 A | | 2/1997 | Joannin ....................... 395/704 |
| 5,606,696 A | * | 2/1997 | Ackerman et al. |
| 5,790,777 A | * | 8/1998 | Izuta et al. |
| 5,862,308 A | * | 1/1999 | Andress et al. |
| 5,948,112 A | * | 9/1999 | Shimada et al. |
| 6,085,244 A | | 7/2000 | Wookey ...................... 709/224 |
| 6,523,141 B1 | * | 2/2003 | Cantrill |
| 6,591,379 B1 | * | 7/2003 | LeVine et al. |

OTHER PUBLICATIONS

U. Maheshwari, et al. "Partitioned Garbage Collection of a Large Object Store", Technical Report MIT/LCS/TR–699, Oct. 1995, p. 1–14.

S. White, et al. "Implementing Crash Recovery in QuickStore: A Performance Study", 1995, p. 1–12.

M. Rosenblum, et al. "The Design and Implementation of a Log–Structured File System" Proceedings of the 13th ACM Symposium on Operating Systems Principles, Jul. 24, 1991, p. 1–15.

* cited by examiner

Primary Examiner—Nadeem Iqbal
(74) Attorney, Agent, or Firm—Amin Turocy LLP

(57) ABSTRACT

A system and method is provided for generating a summary dump file from a system or application crash dump or core dump file without the need for referencing a large symbol table file. A crash dump file with a referencing portion containing references to certain pertinent information (e.g., data structures) including references conventionally not found in crash dump files. The data structures referenced in the referencing portion have been found to be optimal for analyzing faults residing in a crash dump file. The crash dump file may be a complete crash dump file of an operating system or a kernel memory dump. Alternatively, the crash dump file may be a crash dump file of an application program. A stand alone extraction tool is also provided for extracting pertinent information from the crash dump or core dump file by utilizing information in the referencing portion. The stand alone tool generates a summary or mini dump file of the crash dump file.

40 Claims, 11 Drawing Sheets

CREATION OF MINI DUMP FILES FROM FULL DUMP FILES

TECHNICAL FIELD

The present invention relates to computer systems, and more particularly to a system and method for generating a summary of a system crash dump file. The present invention also relates to a system and method for generating a summary of an application program crash dump file.

BACKGROUND OF THE INVENTION

Many operating systems support "crash dumps" or "core dumps". These are typically files that an operating system generates when the operating system recognizes an internal failure. Traditionally, the operating system will switch to a minimal mode of operation and attempt to save the operating system's state information to a file on disk. A software developer or system administrator can subsequently use the saved state information to analyze the operating system failure, for example, offline at a later date. Such analysis is often referred to as "debugging". Generally, a complete crash dump is a dump of all physically memory present in a machine into a file, referred to as a crash dump file, at the time of a fault that caused the system to crash. The crash dump file provides the developers with access to data structures relating to the state of different components on the machine at the time of the fault. Developers can then analyze these data structures to determine the cause of the crash.

Conventionally, a crash dump file can be anywhere from 64 Megabytes to several Gigabytes in size. As machine instructions increase in bit size (e.g., 32 bit, 64 bit, 128 bit) and memory size of these machines increases (e.g., 16 Gigabytes, 32 Gigabytes, 64 Gigabytes, 128 Gigabytes), the size of these full crash dump files will increase in astronomical proportions. The size of these full dump files makes it cumbersome to read through the vast amount of information in the system to isolate the fault that caused the internal failure. Therefore, systems have been developed to allow generation of a summary of the physical memory at the time of the fault. The summary of the physical memory is referred to as a small or mini dump file, which contains a minimal amount of information necessary to isolate faults in many circumstances. For example, Microsoft® Windows® 2000 Operating System allows a user to select between creating a complete memory dump, a kernel memory dump or a small dump file upon a fault condition. A small dump file contains a very small subset of information of the physical memory of the system that can be used to quickly analyze basic operating system failures. For Microsoft ® Windows® 2000, this dump file is 64 Kilobytes in size, which is approximately one thousand to one million times smaller than a complete crash dump file.

Dump files are the most important way for a user to report operating system problems to the vendor or creator of the operating system. However, because of the size of the complete dump file, transferring of these complete dump files over a communication link is inefficient. On the other hand, small or mini dump files can be easily transferred over a communication link. However, in some situations a mini dump file may not be enough for the developer to isolate certain failures. An ideal situation would be to provide a developer with both a complete crash dump file and a mini dump file relating to the failure. However, operating system limitations do not allow for both a complete dump file and a mini dump file to be generated concurrently at failure time.

A tool for extracting pertinent information from a full crash dump file to a mini-dump file would require that the tool load all symbol information residing in a large symbol table file so that the data structures residing in the dump file can be located, such that all the key data structures required for the mini dump file can be extracted from the complete dump file. A symbol is a human readable representation of the data structures residing in the physical memory of the machine. These symbol table files are also quite large and extensive to search through to locate the appropriate information necessary for generating a useful set of information for analysis.

Accordingly, there is an unmet need in the art for a system and method for generating a mini dump file from a crash dump file.

SUMMARY OF THE INVENTION

A system and method is provided for generating a summary dump file from a system crash dump or core dump file without the need for referencing a large symbol table file. Many operating systems support what is known as a crash dump or core dump, which is a file that is generated by the operating system when the operating system recognizes an internal failure. Generally, a crash dump is a dump of all physical memory present in the machine at the time of the fault. The crash dump is then accessible to a developer for analyzing the system state at the time the fault occurred. A crash dump file can be anywhere from 64 Megabytes to many Gigabytes and analysis of these large files has proved to be extremely cumbersome. However, many faults can be isolated by analyzing a portion of the information in the crash dump file. Since the data structures within the crash dump file are simply blocks of numbers, a developer typically needs to refer to a large symbol table file to determine where a data structure may reside.

Therefore, the present invention relates to providing a crash dump file with a referencing portion containing references to certain pertinent information (e.g., data structures), including references conventionally not found in a crash dump files. The data structures referenced in the referencing portion have been found to be optimal for analyzing faults residing in a crash dump file. The crash dump file may be a complete crash dump file of an operating system or a kernel memory dump. Alternatively, the crash dump file may be a crash dump file of an application program. A stand alone extraction tool is also provided for extracting pertinent information from the crash dump or core dump file by utilizing information in the referencing portion. The stand alone tool then generates a summary or mini dump file of the crash dump file (e.g., 64K in size). The stand alone tool can be compiled executable code written in a programming language such as C and/or C++. The summary or mini dump file can be easily communicated over a network or saved to a portable memory device for analysis by a system developer or the like. If the stand alone tool is compiled executable code it can be run remotely and be provided in the form of a Java Applet or an Active X Control, such that the tool can be invoked from a remote site, downloaded to the local machine and executed on the local machine. The mini dump file can then be generated and then transmitted to the remote site for analysis.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
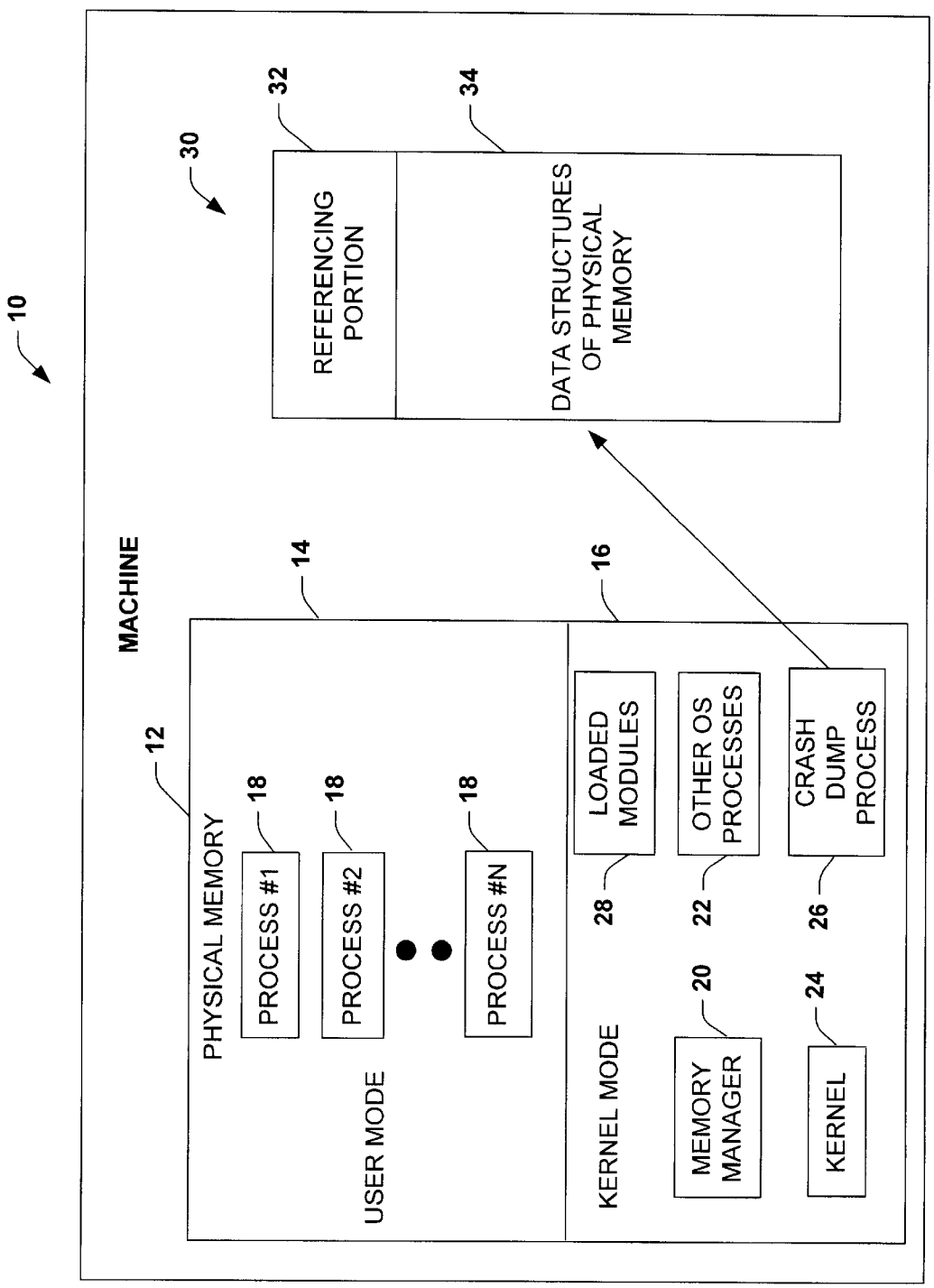
FIG. 1 illustrates a block diagram of a machine having a physical memory with multiple processes and a crash dump file in accordance with one aspect of the present invention.

The present invention is now described with reference to the drawings, wherein like reference numerals are used to refer to like elements throughout. The present invention is described with reference to a system and method for generating a mini dump or summary file from a complete or partial dump file. The means for generating the mini dump or summary file can be a stand alone executable extraction tool that extracts specific data structures from a memory crash dump file. The stand alone executable extraction tool extracts specific data structures from a memory crash dump file. The extraction tool may reside on a local machine that experiences a system crash. The extraction tool can then be utilized to generate a summary of a crash dump from a complete crash dump file or a kernel crash dump file after rebooting the system. The summary crash dump file may be analyzed locally or transmitted over a communication link for analysis by a computer or operating system vendor. Alternatively, the stand alone extraction tool may reside at a remote location wherein the stand alone tool may be invoked from the local machine, downloaded and executed at the local machine and the summary transfer to the remote location over the communication link.

The stand alone extraction tool is operable to extract specific information from the crash dump file ideally suited for determining a source of the fault causing the crash. The present invention comprises providing a specific formatted referencing portion in the crash dump file. An extraction tool is also provided that has embedded knowledge about the referencing portion. The extraction tool can then generate a summary or mini dump file by employing the embedded knowledge to locate the specific information in the crash dump file. The summary or mini dump file can be quickly generated and easily transmitted over a communication link for further analysis. The extraction tool can be applied to kernel mode crashes in which the crash dump file is a complete dump file or a kernel dump file. Alternatively, the extraction tool can be applied to a user mode crash, which has occurred as a result of a fault occurring in an application program.

The term "component" in the specification and the claims refers to a computer-related entity, either hardware, a combination of hardware and software, software, or software in execution. For example, a component may be one or more processes running on a processor, one or more objects, one or more executables, one or more threads of execution, one or more programs, a processor and a computer. By way of illustration, both an application running on a server and the server can be components.

FIG. 1 illustrates an example of a machine 10 including a physical memory component 12 having a user mode portion 14 and a kernel mode portion 16. The user mode portion 14 includes a plurality of processes 18 (e.g., application program processes), or portions of processes, residing in an upper portion or the user mode portion 14 of the physical memory 12. The kernel mode portion 14 includes a number of processes (e.g., operation system processes), or portion of processes, residing in a lower portion or the kernel mode portion 16 of the physical memory 12. The processes running in the kernel mode portion 16 include a memory manager process 20, a kernel process 24, a crash dump process 26, one or more loaded modules 28 and other operating system processes 22. Each of the above processes can include any number of threads associated with a corresponding process. The threads are entities within the process that the kernel schedules for execution in the processor of the machine.

If the machine crashes (e.g., typically due to errors occurring in the kernel mode portion of physically memory), the kernel is interrupted and calls the crash dump process 26, which creates a crash dump file 30 reflecting the state of the current physically memory 12 when the fault occurred. In the present invention, the crash dump process 26 is adapted to provide a referencing portion 32 in the crash dump file 30 that contains specific reference location information to specific data structures residing in a physical memory data structure portion 34. The specific data structures provide information well suited for a developer in determining a cause of the fault. Typically, the crash dump file 30 is a complete crash dump file. Alternatively, the crash dump file 30 may be a kernel memory dump file. A complete memory dump file contains all of the physical memory present on the system at the time of the crash. This type of dump requires that a file be at least the size of physical memory. A kernel memory dump contains only the kernel-mode read/write pages present in physical memory at the time of the crash. A kernel memory dump does not contain pages belonging to user processes. Furthermore, there is no way to predict the size of a kernel memory dump, because its size depends on the amount of kernel-mode memory allocated by the operating system and the number and size of the drivers present on the machine.

Although FIG. 1 illustrates utilization of the crash dump process 26 for generating the crash dump file 30, it is to be appreciated that various processes, functions and/or means can be employed to generate the crash dump file 30. For example, a set of crash dump routines including code for generating the crash dump file 30 can be invoked by a main operating system process to generate the crash dump file 30. Other implementations may be employed based on the particular operating system being utilized.

Figure 2:
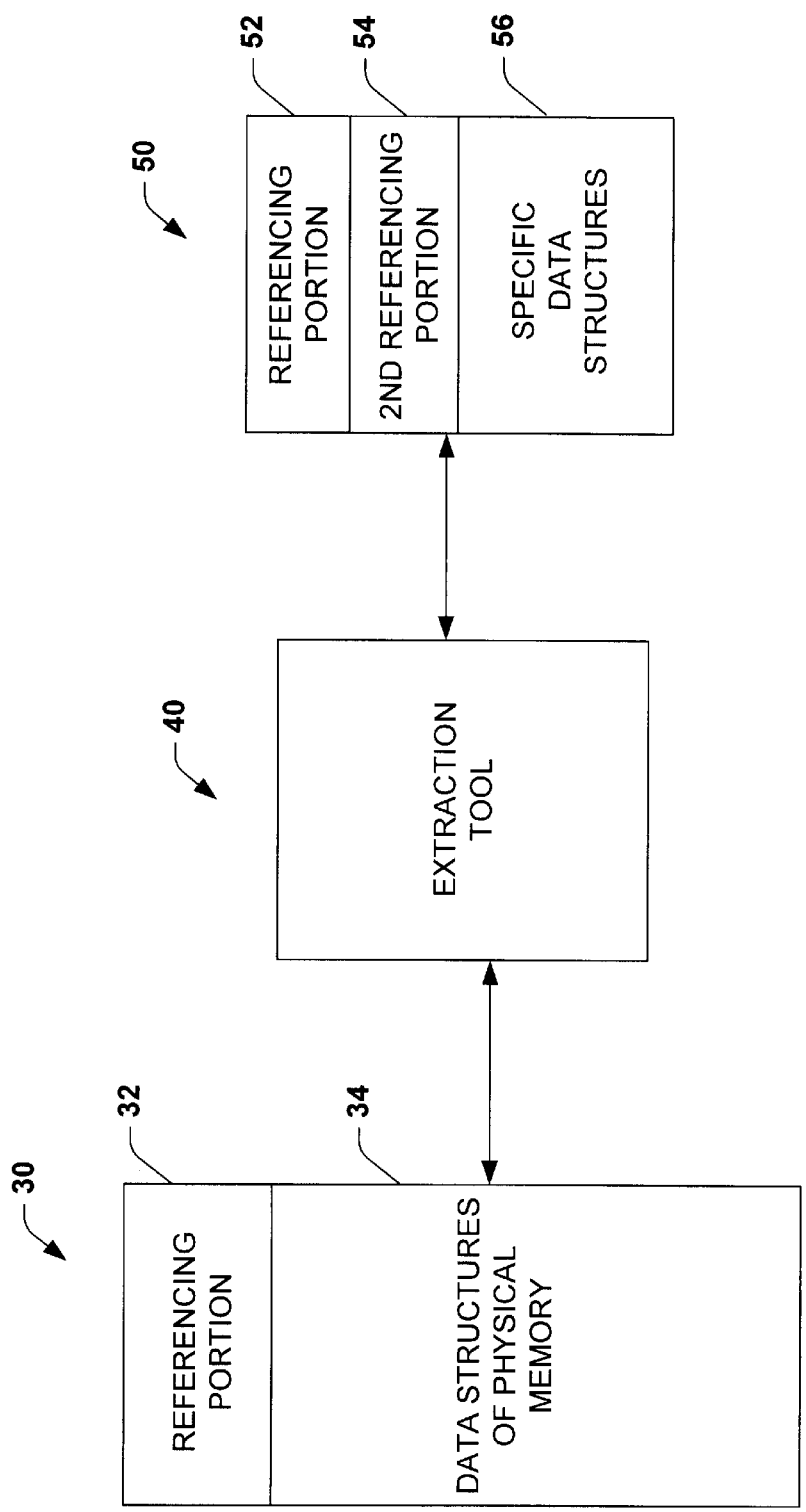
FIG. 2 illustrates a block diagram of an extraction tool generating a summary file from a kernel mode crash dump file in accordance with one aspect of the invention.

FIG. 2 illustrates a block diagram of an extraction tool 40 according to one aspect of the invention. The extraction tool 40 includes embedded knowledge of the format of the referencing portion 32 of the crash dump file 30. The extraction tool 40 knows how to read, interpret and write a reference portion by employing the embedded knowledge. For example, the extraction tool 40 can employ the references to the specific data structures residing in a physical memory data structure portion 34 to extract pertinent data to facilitate isolation of a fault. The extraction tool 40 is typically compiled executable code (e.g., compiled C code) in which embedded knowledge of the referencing portion 32 is compiled within the extraction tool 40. The extraction tool 40 is operable to open the core dump file 30 and extract the specific data structures from the physical memory data structure portion 34. The extraction tool 40 then opens or creates a new mini dump or summary file 50. As illustrated in FIG. 2, the mini dump or summary file 50 is created having a referencing portion 52, a second reference portion 54 and a specific data structures portion 56. For example, the first referencing portion 52 and the second referencing portion 54 can be headers of the summary file 50. The extraction tool 40 provides the summary file with the referencing portion 52 similar to the referencing portion 32 of the crash dump file 30. The extraction tool 40 also provides the summary file 50 with the second referencing portion 54, which contains specific reference location information to specific data structures residing in a specific data structure portion 56 of the mini-dump or summary dump file 50. The specific data structures residing in the specific data structure portion 56 are data structures extracted from the physical memory data structure portion 34 that are ideally suited for fault isolation of the machine 10.

Figure 3:
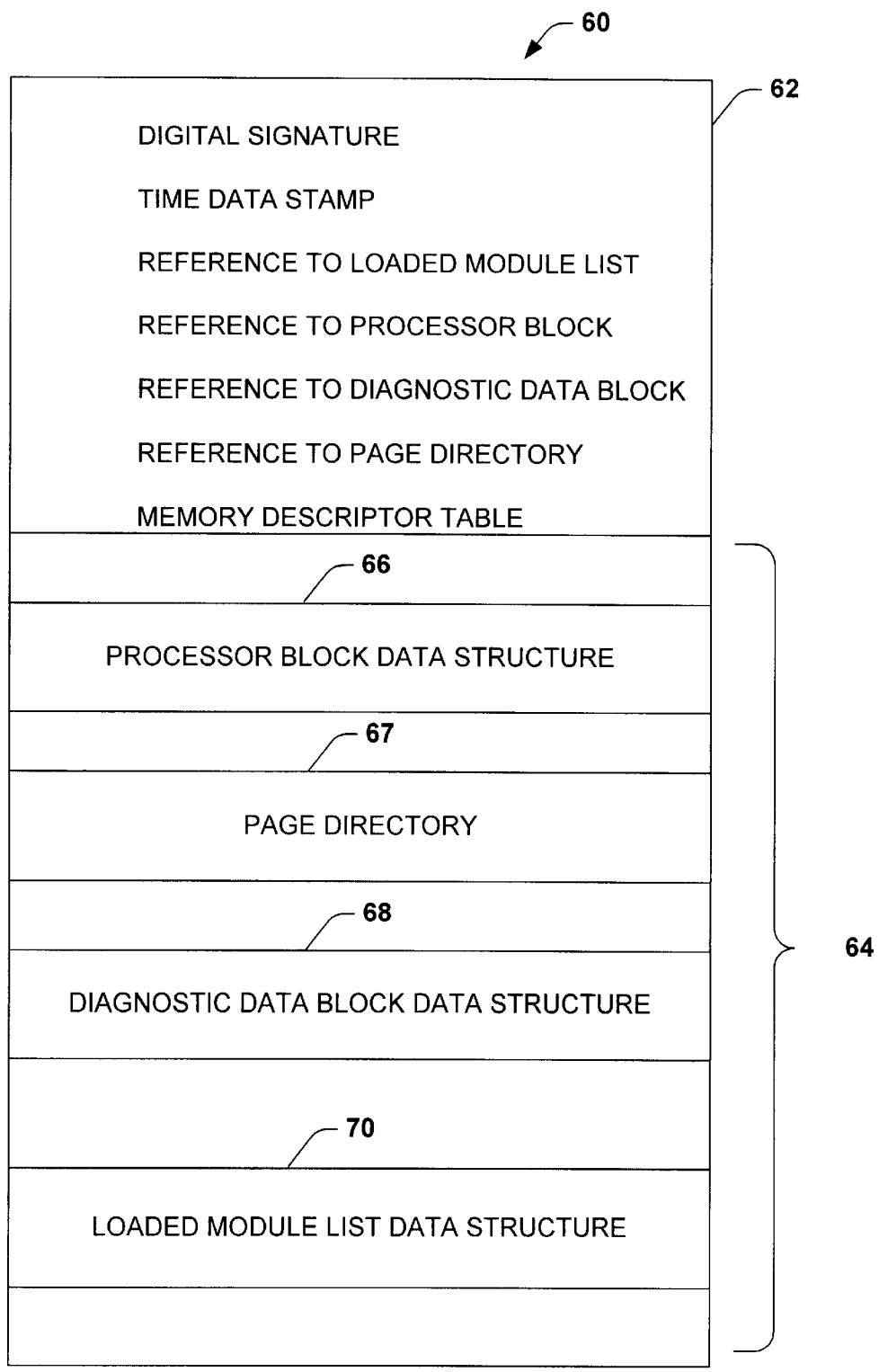
FIG. 3 illustrates a block diagram of an example of a kernel mode crash dump file in accordance with one aspect of the present invention.

FIG. 3 illustrates a block diagram of components residing in an example of a complete crash dump file 60. The complete crash dump file 60 includes a referencing portion 62 and a physical memory data structure portion 64. The referencing portion 62 can be a header containing fields such as a digital signature, a time date stamp, a plurality of references to specific data structures within the physical memory data structure portion 64, reference to a page directory and a memory descriptor table. The page directory and the memory descriptor table provide information for decoding and mapping between virtual memory addresses and the actual physical memory address (e.g., virtual-to-physical address translation). It is to be appreciated that virtual-to-physical address translation and physical-to-virtual address translation is well known to those skilled in the art.

The plurality of references include a reference (e.g., virtual address) to a loaded module list (e.g., device drivers), a reference (e.g., virtual address) to a processor block (e.g., kernel data block), a reference (e.g., virtual address) to a diagnostic data block (e.g., kernel debugger block) and a reference (e.g., physical address) to a page directory table. Providing the reference to the processor block and the diagnostic data block eliminates the need for referencing utilizing a large symbol table file, which was conventionally done to reverse engineer diagnostic faults. The large symbol table file is a table having human readable references to the data residing in the physical memory. The present invention includes providing references to this data in the referencing portion of the crash dump file, so the need to look up these references in the large symbol table file is eliminated. The reference to the processor block references a processor block data structure 66 residing in the physical memory data structure portion 64. The reference to the loaded module list references a loaded module list data structure 68 residing in the physical memory data structure portion 64. The reference to the diagnostic data block references a diagnostic data block data structure 70 residing in the physical memory data structure portion 64. The reference to the page directory refers to a page directory table 67 residing in the physical memory data structure portion 64. Each of the data structures contains several fields relating to the state of the physical memory of the machine at the time of the fault.

For example, the processor block data structure 66 can include the state of the current thread and the current process being executed by the processor at the time of the fault. Additionally, the processor block data structure 66 can include the state of the kernel stack and/or the operating system stack at the time of the fault. It is to be appreciated that the above data structures residing in the actual physical memory portion of the core dump file have been found to facilitate isolation of faults in machine crashes caused by faults in the kernel and/or the operating system of the machine. It is to be appreciated that additional or different types of information may be more or less useful in different machine and operating system configurations having different types of faults.

The extraction tool 40 utilizes information in the referencing portion 62 of the crash dump file 60 to extract information out of the physical memory data structure portion 64. In one aspect of the invention, the extraction tool 40 utilizes the memory descriptor table in the referencing portion 62 to locate the page directory in the physical memory data structure portion 64. The extraction tool 40 then converts the various virtual addresses, located in the referencing portion 62, of the loaded module list, the processor block and the diagnostic data block into physical addresses using the page directory data. The physical address is then looked up in the physical memory data structure portion 64 and the located information utilized to generate a summary file.

Figure 4:
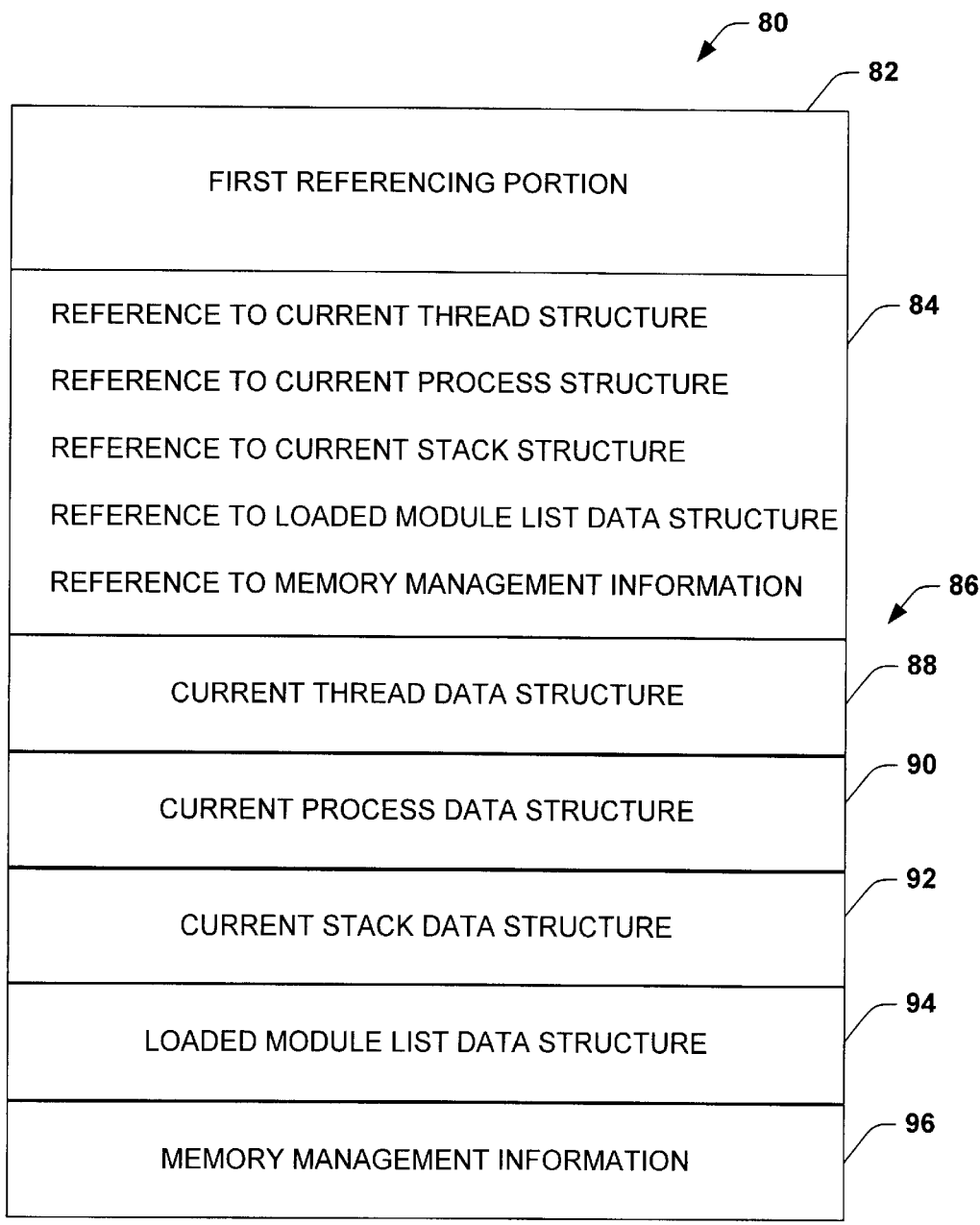
FIG. 4 illustrates a block diagram of an example of a kernel mode crash dump summary file in accordance with one aspect of the present invention.

FIG. 4 illustrates a block diagram of components residing in an example of a mini or summary crash dump file 80 generated by the extraction tool 40 illustrated in FIG. 2. The mini dump file 80 includes a first referencing portion 82 generally matching references of a referencing portion of the crash dump file that the extraction tool utilized to generate the mini dump file. The mini dump file 80 includes a second referencing portion 84 and a specific data structures portion 86. In one aspect of the invention, the first and second referencing portion 82 and 84 have a size of about 8 kilobytes, while the specific data structure portion 86 has a size of about 56 kilobytes for a total of 64 kilobytes. The specific data structures portion 84 includes a current thread data structure 88, a current process data structure 90, a current stack data structure 92, a loaded module list data structure 94 and a memory management information block 96.

The current thread data structure 88 refers to the state of the executing thread (e.g., Ethread) at the time of the fault. The current process data structure 90 refers to the state of the process (e.g., EProcess) of the executing thread at the time of the fault. Typically, the process data structure 90 includes information relating to a private virtual address space, which is a set of virtual memory addresses that the process can use, an executable program which defines initial code and data that is mapped into the process's virtual address space, a list of open handles to various system resources, such as semaphores, communication ports and files that are accessible to all threads in the process, security context information, a unique identifier and at least one thread of execution. The current stack data structure 92 includes the state of the stack of the kernel (e.g., processor registers of the kernel at the time of the kernel's last execution) at the time of the fault. The loaded module list data structure 94 refers to the state of the drivers loaded by the operating system at the time of the fault. The memory management information refers to the state of the memory management system at the time of the fault in addition to information relating to the mapping of virtual memory addresses to physical memory addresses.

A plurality of references are provided in the second referencing portion 84 to provide location information related to the data structures. The plurality of references (e.g., pointers) include a reference to the location of the current thread data structure 88, a reference to the location of the current process data structure 90, a reference to the location of the current stack data structure 92, a reference to the location of the loaded module list data structure 94 and a reference to the memory management information 96 located in the specific data structure 86 of the summary dump file 80. Therefore, a developer or an application can quickly locate information relating to the fault by utilizing the referencing portion to locate the various states of the data structures at the time of the crash.

Figure 5:
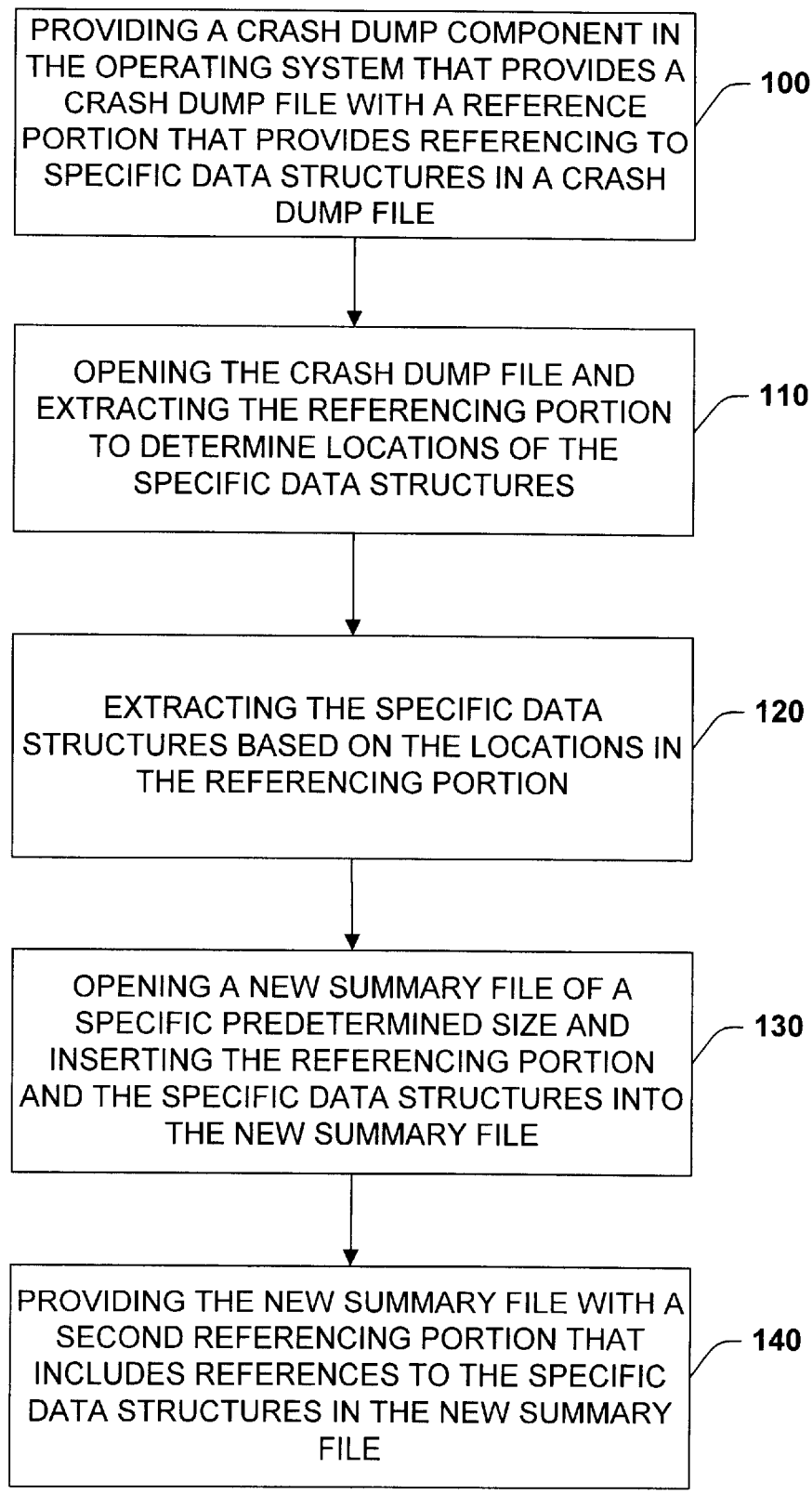
FIG. 5 illustrates a flow diagram of a methodology for generating a summary file of a kernel mode crash dump file in accordance with one aspect of the invention.

In view of the structure described above with respect to FIGS. 1–4, a methodology for providing the particular aspects of the invention may be better appreciated with respect to the flow diagram of FIG. 5. While, for purposes of simplicity of explanation, the methodology of FIG. 5 is shown and described as a series of steps, it is to be understood and appreciated that the present invention is not limited to the order of steps, as some steps may, in accordance with the present invention, occur in different orders, and/or concurrently with other steps from that shown and described herein. Moreover, not all illustrated steps may be required to implement a methodology in accordance with an aspect of the present invention.

FIG. 5 illustrates one particular methodology for generating a summary file from a crash dump file generated by a system crash. At step 100, a crash dump component residing in the operating system generates a crash dump file of the state of the physical memory present in the system at the time of the fault. The crash dump file includes a referencing portion that provides references to specific data structures in the crash dump file. At step 110, the extraction tool opens the crash dump file and extracts the referencing portion of the crash dump file to determine the locations of specific data structures. The extraction tool then extracts the specific data structures based on the locations referenced in the referencing portion at step 120. At step 130, the extraction tool opens a new summary file of a specific predetermined size and inserts a copy of the referencing portion and the specific data structures into the new summary file. The extraction tool then provides the new summary file with a second referencing portion that includes references to the specific data structures in the new summary file at step 140.

Figure 6:
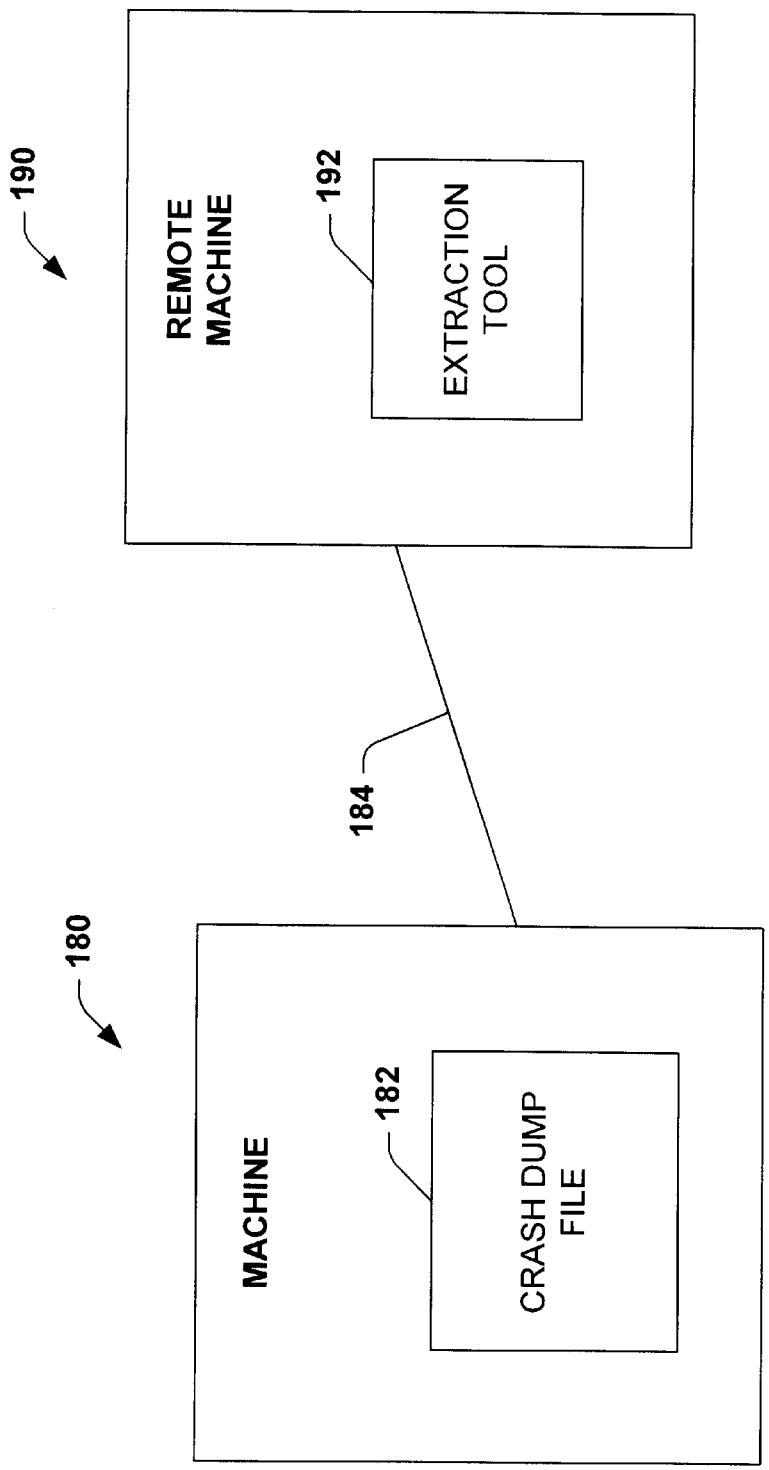
FIG. 6 illustrates a block diagram of a remote machine having an extraction tool resident thereon for generating a summary file of a crash dump file resident on a local machine in accordance with one aspect of the invention.

It is to be appreciated that since the extraction tool component is a stand alone tool, it may reside at a remote location from the crash dump file. Therefore, the stand alone tool may reside at a remote machine and be invoked at a local machine. FIG. 6 illustrates a block diagram of a local machine 180 having a crash dump file 182 residing on the local machine after a system crash has occurred. A remote machine 190 is connected to the local machine 180 by a communication link 184. An extraction tool 192 resides on the remote site 190. For example, after the local machine 182 is rebooted the extraction tool 192 can be invoked on a website via a Java Applet or an Active X Control. Invocation of the Java Applet or Active X Control causes the extraction tool 192 to be downloaded to the local machine 180, execute on the local machine 180 and transmit a summary dump file to the remote machine 190. The above application is ideally suited for a technical support site of a computer or operating system vendor, such that a developer receives the summary dump file at the remote machine and can review the summary dump file to fault isolate the cause of the system crash. If the fault cannot be determined by the summary dump file, then the developer can request the entire crash dump file for further evaluation.

It is to be appreciated that the present invention is not limited to system crash dump files that represent the state of the entire physical memory at crash time or kernel crash dump files that represent the contents of kernel related information at crash time. In other words, the present invention is not limited to information operating in kernel mode, but is also applicable to information related to user mode, such as an application crash dump file occurring as a result of a fault generated within an application program during the execution of the application program. For example, a user mode dump file for an application can be 50 to 100 megabytes in size. The user mode dump file is also too large to transmit over a communication link back to a computer or operating system vendor.

Figure 7:
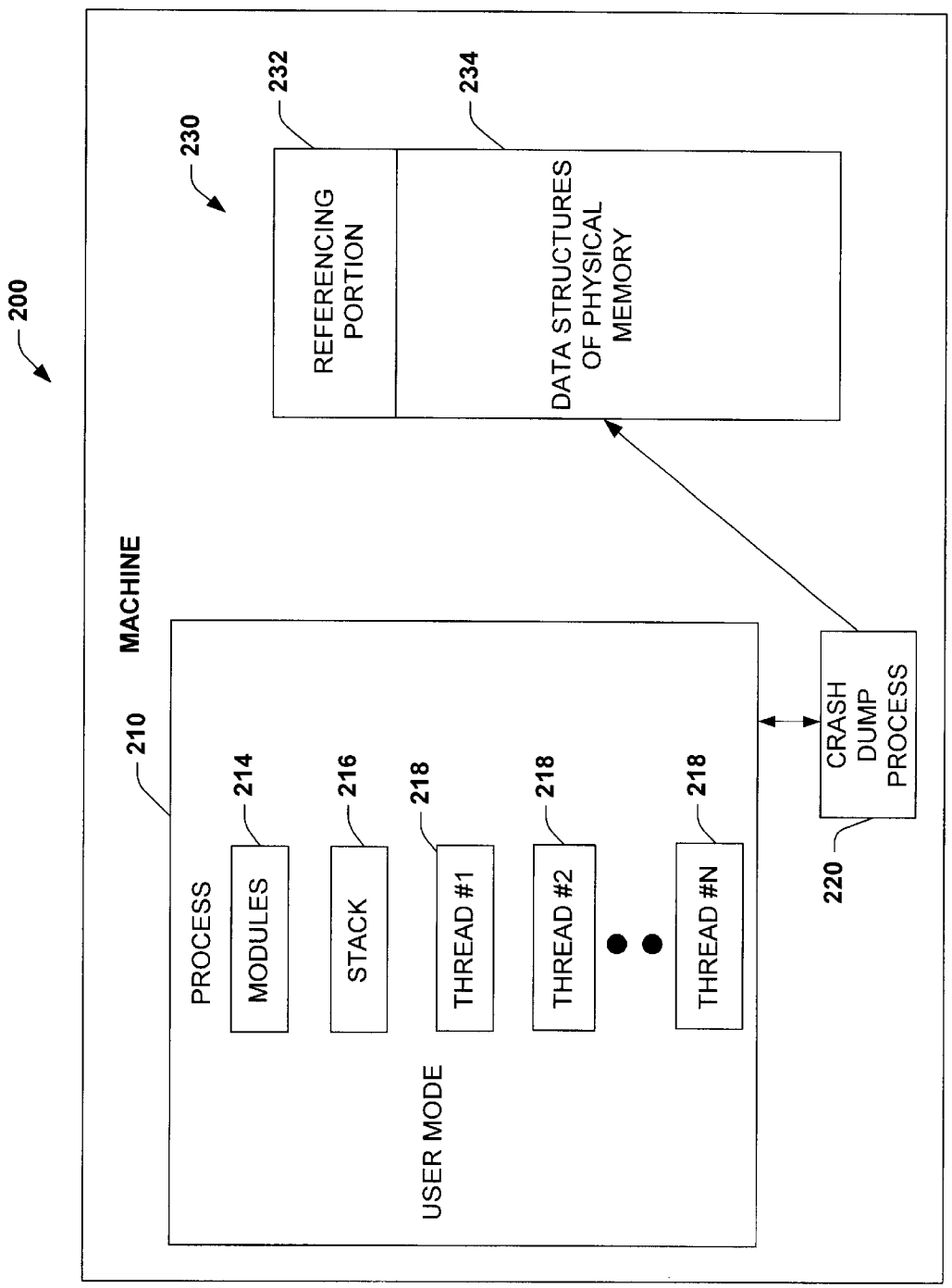
FIG. 7 illustrates a block diagram of a machine having a user mode physical memory with multiple processes and a user mode crash dump file in accordance with one aspect of the present invention.

FIG. 7, illustrates an example of a machine 200 including a portion of a physical memory component 210 (e.g., a user mode portion of the actual physical memory). The user mode portion 210 includes at least one process running in the user mode portion 210. In the present example, a process is executing that includes a list of modules 214 that the process has loaded, a process stack 216 and a plurality of threads 218 owned by the process. If the process crashes (e.g., application program aborts), a crash dump process 220 creates an application crash dump file 230 reflecting the state of the process in virtual memory when the fault occurred. In the present invention, the crash dump process 220 is adapted to provide a referencing portion 232 in the crash dump file 230 that contains specific reference location information to specific data structures of the process residing in a virtual memory data structure portion 234. The specific data structures provide information well suited for an application developer in determining a cause of the fault.

Figure 8:
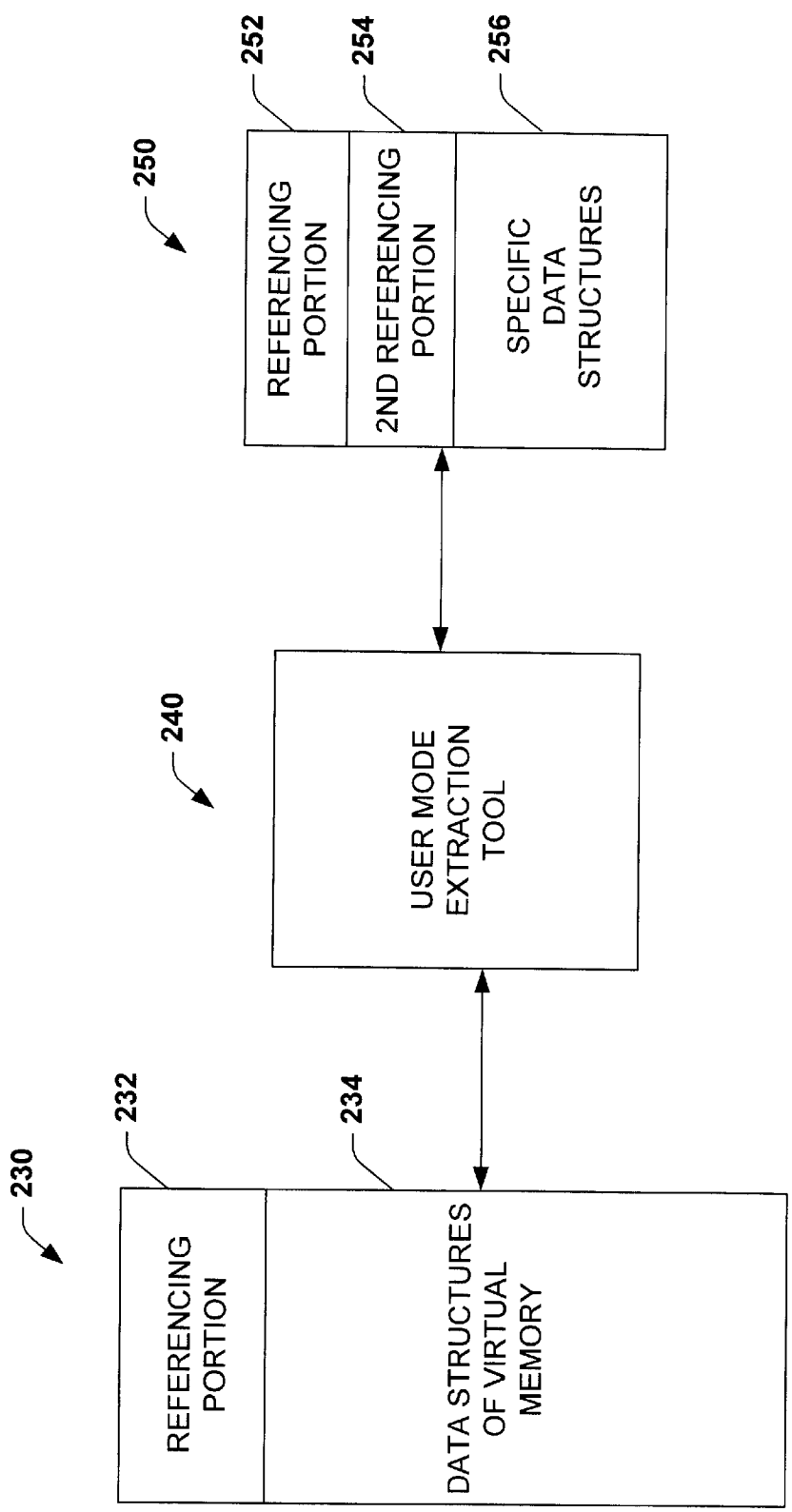
FIG. 8 illustrates a block diagram of a user mode extraction tool generating a summary file from a user mode crash dump file in accordance with one aspect of the invention.

FIG. 8 illustrates a block diagram of a user mode extraction tool 240 according to one aspect of the invention. The user mode extraction tool 240 includes embedded knowledge of the format of the referencing portion 232 of the application crash dump file 230. The user mode extraction tool 240 knows how to read, interpret and write a reference portion. For example, the extraction tool 240 can employ the references to the specific data structures residing in the virtual memory data structure portion 234 to extract pertinent data to facilitate isolation of a fault. The extraction tool 240 is typically compiled executable code (e.g., compiled C code) in which embedded knowledge of the referencing portion 232 is compiled within the extraction tool 240. The user mode extraction tool 240 is operable to open the application crash dump file 230 and locate and extract the specific data structures from the physical memory data structure portion 234. The user mode extraction tool 240 then opens or creates a new mini dump or summary file containing only the specific data structures.

As illustrated in FIG. 8, a mini dump or summary file 250 is created having a referencing portion 252, a second reference portion 254 and a specific data structures portion 256. For example, the first referencing portion 252 and the second referencing portion 254 can be headers of the summary file 250. The user mode extraction tool 240 provides the summary file 250 with the referencing portion 252, which is similar to the referencing portion 232 of the application crash dump file 230. The user mode extraction tool 240 also provides the summary file 250 with the second referencing portion 254. The second referencing portion 254 contains specific reference location information to the specific data structures residing in the data structure portion 256 of the user mode mini dump or summary dump file 250.

Figure 9:
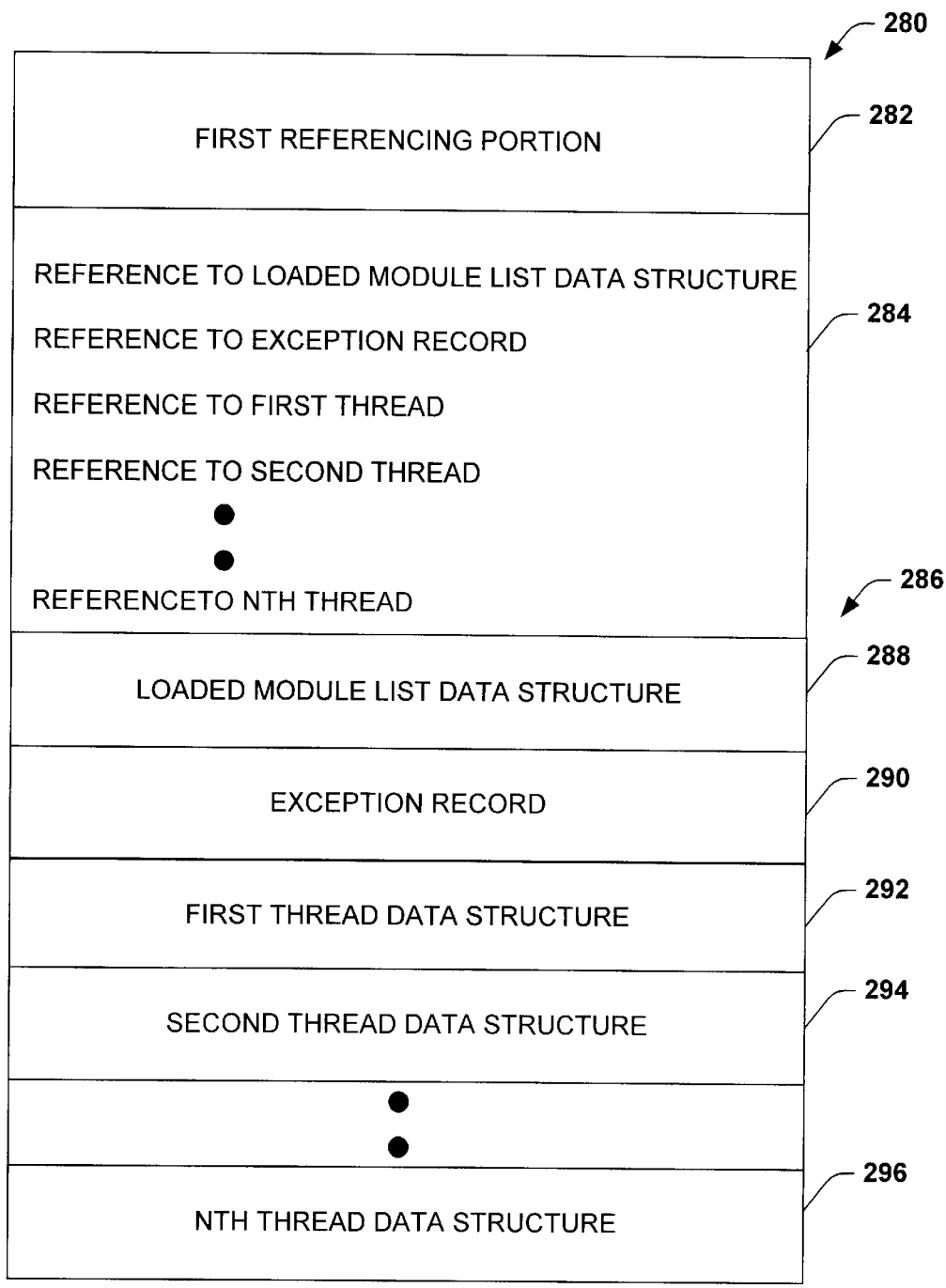
FIG. 9 illustrates a block diagram of an example of a user mode crash dump summary file in accordance with one aspect of the present invention.

FIG. 9 illustrates a block diagram of components residing in an example of a user mode mini or summary crash dump file 280 generated by the extraction tool 240 illustrated in FIG. 8. The mini dump file 280 includes a first referencing portion 282 generally matching references of a referencing portion of the crash dump file that the user mode extraction tool 240 utilized to generate the user mode mini dump file 280. The user mode mini dump file 280 includes a second referencing portion 284 and a specific data structure portion 286. The specific data structure portion 286 includes a loaded module list data structure 288, an exception, record data structure 290, a first thread structure 292, a second thread data structure 294 up to an nth thread data structure 296. The loaded module list data structure 288 refers to the state of the drivers loaded by the application program at the time of the fault. The exception record data structure 290 is a block of data that describes where a fault occurred.

The first thread data structure 292, the second thread data structure 294 to the nth thread data structure 296 refers to the state of the various threads at the time of the fault. The second referencing portion 284 includes references (e.g., pointers) to referencing locations of the various data structures residing in the specific data structure portion 286 of the user mode mini or summary file 280. It is to be appreciated that additional or different types of information may be more or less useful in different machine and application program configurations having different types of faults.

Figure 10:
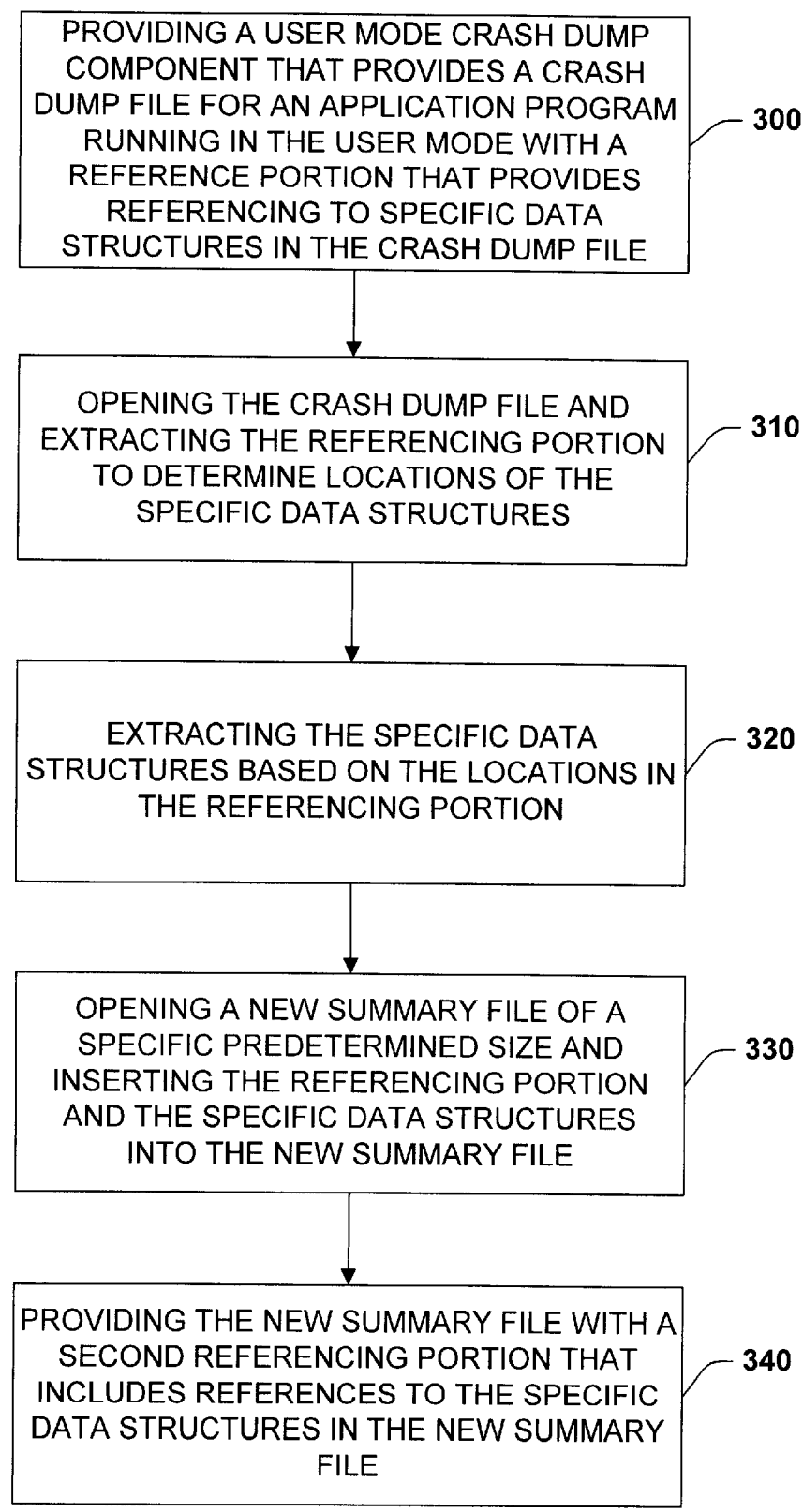
FIG. 10 illustrates a flow diagram of a methodology for generating a summary file of a user mode crash dump file in accordance with one aspect of the invention.

In view of the structure described above with respect to FIGS. 6–9, a methodology for providing the particular aspects of the invention may be better appreciated with respect to the flow diagram of FIG. 10. While, for purposes of simplicity of explanation, the methodology of FIG. 10 is shown and described as a series of steps, it is to be understood and appreciated that the present invention is not limited to the order of steps, as some steps may, in accordance with the present invention, occur in different orders and/or concurrently with other steps from that shown and described herein. Moreover, not all illustrated steps may be required to implement a methodology in accordance with an aspect the present invention.

FIG. 10 illustrates one particular methodology for generating a user mode summary file from a crash dump file generated by an application program fault. At step 300, a crash dump process on a machine generates a user mode crash dump file representing the state of the virtual memory of the application program running in the user mode at the time of the fault. The user mode crash dump file includes a referencing portion that provides referencing to specific data structures in the crash dump file ideally suited for fault isolation of the application program fault. At step 310, the user mode extraction tool opens the user mode crash dump file and extracts the referencing portion of the crash dump file to determine the locations of the specific data structures. The user mode extraction tool then extracts the specific data structures based on the locations referenced in the referencing portion of the user mode crash dump file at step 320. At step 330, the user mode extraction tool opens a new summary file of a specific predetermined size and inserts a copy of the referencing portion and the specific data structures into the new summary file. The user mode extraction tool then provides the new summary file with a second referencing portion that includes references to the specific data structures in the new summary file at step 340.

It is to be appreciated that although the above examples of a kernel mode and user mode extraction tool have been represented as separate components, the extraction tools can be combined into a single tool. The single tool can be operable to recognize the type or the locations of the crash dump file and perform the extraction based on whether the crash dump file is a kernel mode or user mode crash dump file.

Figure 11:
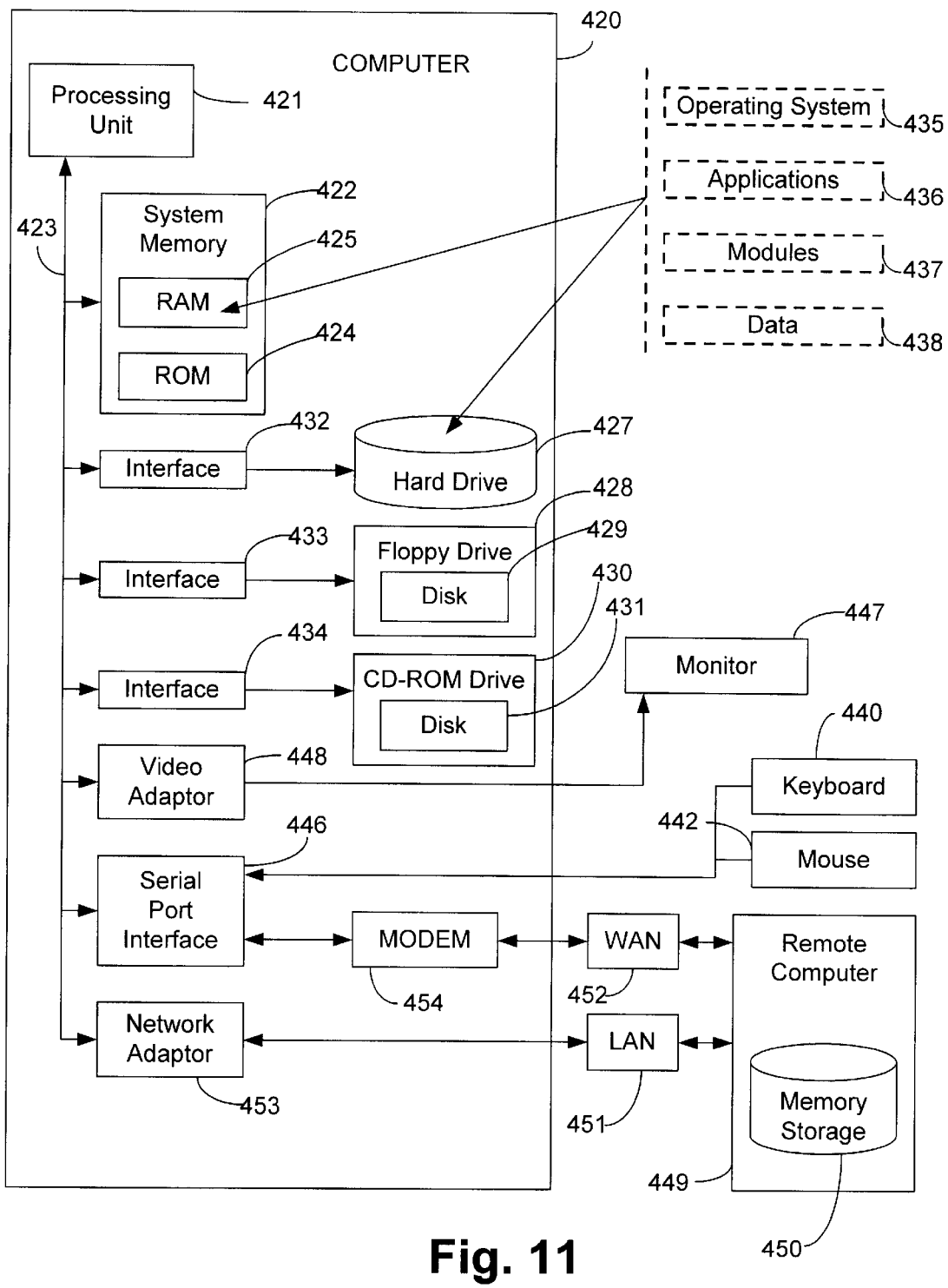
FIG. 11 illustrates a block diagram of a computer system in accordance with an environment of the present invention.

With reference to FIG. 11, an exemplary system for implementing the invention includes a conventional personal or server computer 420, including a processing unit 421, a system memory 422, and a system bus 423 that couples various system components including the system memory to the processing unit 421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment. A number of program modules may be stored in the drives and RAM 425, including an operating system 435, one or more application programs 436, other program modules 437, and program data 438.

A user may enter commands and information into the computer 420 through a keyboard 440 and pointing device, such as a mouse 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a parallel port, game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as a remote server or client computer 449. The remote computer 449 may be a workstation, a server computer, a router, a peer device or other common network node, and typically includes many or all of the elements described relative to the computer 420, although only a memory storage device 450 has been illustrated in FIG. 11. The logical connections depicted in FIG. 11 include a local area network (LAN) 451 and a wide area network (WAN) 452. Such networking environments are commonplace in offices, enterprise-wide computer networks, intranets and the Internet.

When used in a LAN networking environment, the computer 420 is connected to the local network 451 through a network interface or adapter 453. When used in a WAN networking environment, the server computer 420 typically includes a modem 454, or is connected to a communications server on the LAN, or has other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 420, unless indicated otherwise. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and a particular example, however, it is to be appreciated that various programming methodologies and/or computer architectures suitable for carrying out the present invention may be employed and are intended to fall within the scope of the hereto appended claims.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for generating a summary of a crash dump file comprising; a stand alone extraction tool operable to retrieve specific data structures from a crash dump file without requiring utilization of a symbol table file, the stand alone extraction tool employing references residing in a referencing portion of the crash dump file, the references providing location information for the specific data structures within the crash dump file, wherein the stand alone extraction tool is operable to generate a summary file, the summary file containing a referencing portion having references to locations of the specific data structures residing in a data structure portion of the summary file.

2. The system of claim 1, the stand alone extraction tool being comprised of compiled executable code.

3. The system of claim 1, the compiled executable code having embedded knowledge of the format of the referencing portion of the crash dump file.

4. The system of claim 1, the stand alone extraction tool generating a summary file having a first referencing portion similar to the referencing portion in the crash dump file and a second referencing portion for referencing specific data structures in the summary file.

5. The system of claim 4, the first and second referencing portions being a first and a second header.

6. The system of claim 4, the second referencing portion comprising a plurality of references referring to locations in the files where different data structures of the specific data structures reside in the summary file.

7. The system of claim 6, the data structure portion comprising at least one of a current thread data structure, a current process data structure, a current stack data structure and a loaded module list data structure.

8. The system of claim 1, the stand alone extraction tool extracting data relating to a kernel mode failure.

9. The system of claim 1, the stand alone extraction tool extracting data relating to a user mode failure.

10. The system of claim 1, the stand alone extraction tool residing at a local machine, such that the stand alone extraction tool can be executed at the local machine where the fault has occurred and the summary file be generated at the local machine, the summary file being transferable to a remote machine.

11. The system of claim 1, the stand alone extraction tool residing at a remote machine, such that the stand alone extraction tool can be invoked from the local machine where the fault occurred via a communication link wherein the stand alone tool is downloaded and executed at the local machine and generates a summary file that is transmitted back to the remote machine.

12. A system for generating a crash dump file comprising;
    a crash dump component operable to generate a crash dump file having references residing in a referencing portion of the crash dump file, the references including location information of specific data structures within the crash dump file suited for facilitating identification of sources of system faults without requiring utilization of a symbol table file.

13. The system of claim 12, the references comprising a reference to a processor block data structure.

14. The system of claim 13, the references further comprising a reference to a diagnostic block data structure.

15. The system of claim 14, the processor block data structure comprising a kernel data block structure and the diagnostic block data structure comprising a kernel debugger data block structure.

16. The system of claim 12, the references further comprising a reference to a loaded module list data structure suited.

17. A method for generating a crash dump file comprising:
generating a crash dump file upon a fault occurring on a machine, the crash dump file having a physical memory data structure portion reflecting the state of at least a portion of the actual physical memory on the machine at the time of the fault;
providing the crash dump file with a referencing portion for referencing data structures residing in the physical memory data structure portion; and
providing the referencing portion with references suited for facilitating identification of sources of system faults without requiring utilization of a symbol table file.

18. The method of claim 17, the references comprising a reference to a processor block data structure.

19. The method of claim 18, the references comprising a reference to a diagnostic block data structure.

20. The method of claim 19, the processor block data structure comprising a kernel data block structure and the diagnostic block data structure comprising a kernel debugger data block structure.

21. The method of claim 17, further comprising providing the referencing portion with a reference to a loaded module list data structure suited for facilitating identification of sources of system faults.

22. The method of claim 17, the crash dump file being a complete crash dump file.

23. The method of claim 17, the crash dump file being a kernel crash dump file.

24. A computer-readable medium having computer-executable instruction for:
generating a crash dump file upon a fault occurring on a machine, the crash dump file having a physical memory data structure portion reflecting the state of at least a portion of the actual physical memory on the machine at the time of the fault;
providing the crash dump file with a referencing portion for referencing data structures residing in the physical memory data structure portion; and
providing the referencing portion with references suited for facilitating identification of sources of system faults without requiring utilization of a symbol table file.

25. A method for generating a summary of a crash dump file from a machine that has experienced a fault condition comprising;
opening a crash dump file;
retrieving a referencing portion of the crash dump file, the referencing portion having references providing location information for specific data structures residing in the crash dump file;
extracting the specific data structures;
generating a summary file;
inserting the specific data structures into the summary file; and
providing the summary file with a referencing portion containing references to locations of the specific data structures within the summary file.

26. The method of claim 25, the crash dump file being a kernel mode crash dump file.

27. The method of claim 25, the crash dump file being a user mode crash dump file.

28. The method of claim 25, the references comprising a plurality of references referring to locations in the files where different data structures of the specific data structures reside in the summary file.

29. The method of claim 25, the specific data structures comprising at least one of a current thread data structure, a current process data structure, a current stack data structure and a loaded module list data structure.

30. The method of claim 25, the specific data structures comprising at least one of a loaded module list data structure and at least one thread data structure relating to a thread that has experienced a fault.

31. The method of claim 25, further comprising transmitting the summary file over a communication link to a remote machine.

32. A computer-readable medium having computer-executable instruction for
opening a crash dump file;
retrieving a referencing portion of the crash dump file, the referencing portion having references providing location information for specific data structures residing in the crash dump file;
extracting the specific data structures;
generating a summary file;
inserting the specific data structures into the summary file; and
providing the summary file with a referencing portion containing references to locations of the specific data structures within the summary file.

33. A computer-readable medium having stored thereon a crash dump file, comprising:
a physical memory data structure portion reflecting the state of at least a portion of an actual physical memory on a machine at the time of a fault; and
a referencing portion for referencing data structures residing in the physical memory data structure portion, the referencing portion being suited for facilitating identification of sources of system faults without requiring utilization of a symbol table file.

34. The computer readable medium of claim 33, the references comprising a processor block data structure.

35. The computer readable medium of claim 34, the references comprising a diagnostic block data structure.

36. The computer readable medium of claim 35, the processor block data structure comprising a kernel data block structure and the diagnostic block data structure comprising a kernel debugger data block structure.

37. A computer-readable medium having stored thereon a summary of a user mode crash dump file, comprising:
a specific data structure portion reflecting the state of an application program at the time of a fault; and
a referencing portion for referencing data structures residing in the specific data structure portion, the referencing portion having a reference to at least one of a loaded module list data structure and at least one thread data structure relating to the application program that has experienced the fault.

38. A system for generating a summary dump file of a crash dump file comprising:

means for generating a crash dump file upon a fault occurring on a machine, the crash dump file having a memory data structure portion reflecting the state of at least a portion of the memory at the time of the fault and a referencing portion for referencing data structures residing in the memory data structure portion; and means for generating a summary file from the crash dump file, the means for generating the summary file retrieving the referencing portion of the crash dump file, the referencing portion having references suited for facilitating identification of sources of system faults without requiring utilization of a symbol table file, the references providing location information for specific data structures residing in the crash dump file, the means for generating a summary file extracting the specific data structures and generating a summary file having the specific data structures and a referencing portion containing references to locations of the specific data structures within the summary file.

39. The system of claim 38, the crash dump file being a kernel mode crash dump file.

40. The system of claim 38, the crash dump file being a user mode crash dump file.

\* \* \* \* \*